(12) United States Patent
Skare et al.

(10) Patent No.: US 8,782,538 B1
(45) Date of Patent: Jul. 15, 2014

(54) DISPLAYING A SUGGESTED QUERY COMPLETION WITHIN A WEB BROWSER WINDOW

(75) Inventors: Travis M. Skare, Mountain View, CA (US); Srikanth Rajagopalan, San Carlos, CA (US)

(73) Assignee: Google Inc., Mountain View, CA (US)

( * ) Notice: Subject to any disclaimer, the term of this patent is extended or adjusted under 35 U.S.C. 154(b) by 107 days.

(21) Appl. No.: 13/414,676

(22) Filed: Mar. 7, 2012

(51) Int. Cl.
*G06F 3/00* (2006.01)

(52) U.S. Cl.
USPC ........... 715/760; 715/780; 715/812; 715/968; 715/856

(58) Field of Classification Search
USPC .................. 715/760, 226, 780, 812, 968, 856
See application file for complete search history.

(56) References Cited

U.S. PATENT DOCUMENTS

| | | | |
|---|---|---|---|
| 2007/0050339 A1* | 3/2007 | Kasperski et al. | 707/3 |
| 2011/0078243 A1* | 3/2011 | Carpenter et al. | 709/204 |
| 2012/0284293 A1* | 11/2012 | Nierenberg | 707/766 |

OTHER PUBLICATIONS

GLOBEFEED.com—http://www.globefeed.com/flinkpreview.html, 2009, pp. 1-3.*
Thumbshots.com—http://www.thumbshots.com/Learn.aspx, Sep. 13, 2011, pp. 1-7.*

* cited by examiner

*Primary Examiner* — Kieu Vu
*Assistant Examiner* — Joy M Weber
(74) *Attorney, Agent, or Firm* — McDermott Will & Emery LLP (57) ABSTRACT

Systems and methods for displaying a suggested query completion in a web browser window while providing for display a first webpage within a webpage display region of the web browser window are provided. A method includes, receiving an initiation of a query within an input box in a control region of the web browser window. The method also includes providing for display a dropdown region within the web browser window in response to the initiation of the query. The dropdown region includes suggested completions to the initiation of the query. At least one of the suggested completions is associated with a second webpage. The method also includes providing for display a webpage preview of the second webpage within the dropdown region.

28 Claims, 7 Drawing Sheets

DISPLAYING A SUGGESTED QUERY COMPLETION WITHIN A WEB BROWSER WINDOW

FIELD

The subject technology generally relates to web browser user interfaces and, in particular, relates to displaying a suggested query completion within a web browser window.

BACKGROUND

A web browser window displayed on a computing device may contain one or more input boxes, for example a uniform resource locator (URL) input box configured to allow a user to enter a URL query, a search input box configured to allow a user to enter a search query, or an omnibox that functions as both a URL input box and a search input box and allows the user to enter either a URL query or a search query. While the user is entering input, a dropdown region of the web browser may display one or more suggested completions for the input, for example, if the user types the letters "www.exa" into a URL input box, the completion "www.example.com" for the input URL may be suggested. However, the suggested completions may not be very informative for the user.

SUMMARY

The disclosed subject matter relates to a computer-implemented method for displaying a suggested query completion in a web browser window while providing for display a first webpage within a webpage display region of the web browser window. The method includes receiving an initiation of a query within an input box in a control region of the web browser window. The control region is external to the webpage display region. The method also includes providing for display a dropdown region within the web browser window in response to the initiation of the query. The dropdown region includes one or more suggested completions to the initiation of the query. At least one of the one or more suggested completions is associated with a second webpage. The method also includes providing for display a webpage preview of the second webpage within the dropdown region.

The disclosed subject matter further relates to a computer-readable medium. The computer-readable medium includes instructions that, when executed by a machine, cause the machine to implement a method for displaying a suggested query completion in a web browser window while providing for display a first webpage within a webpage display region of the web browser window. The instructions include code for receiving an initiation of a query within an input box in a control region of the web browser window. The instructions also include code for providing for display a dropdown region within the web browser window in response to the initiation of the query. The dropdown region includes one or more suggested completions to the initiation of the query. At least one of the one or more suggested completions includes a uniform resource locator (URL) of a second webpage. The instructions also include code for providing for display a thumbnail of the second webpage within the dropdown region.

The disclosed subject matter further relates to a system. The system includes one or more processors. The system also includes a memory including instructions which, when executed by the one or more processors, cause the one or more processors to implement a method for displaying a suggested query completion in a web browser window while providing for display a first webpage within a webpage display region of the web browser window. The instructions include code for receiving an initiation of a query within an input box in a control region of the web browser window. The initiation of the query includes at least one character. The instructions also include code for providing for display a dropdown region within the web browser window in response to the initiation of the query. The dropdown region includes one or more suggested completions to the initiation of the query. At least one of the one or more suggested completions includes a uniform resource locator (URL) of a second webpage. The instructions also include code for providing for display a webpage preview of the second webpage within the dropdown region.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As illustrated above in the Background, an approach to displaying a suggested query completion within a web browser window that would provide more information about the suggested query completion to the user may be desirable. For example, if the user types the letters "www.exa" into a uniform resource locator (URL) input box, and the completion "www.example.com" for the input search query is suggested, the user may want to know what information related to the URL "www.example.com" the web browser could provide.

The subject technology is related to displaying a suggested query completion in a web browser window while providing for display a first webpage within a webpage display region of the web browser window. The webpage displayed in the webpage display region may be a hypertext markup language (HTML) page including rendered HTML code. The webpage may include one or more embedded items, e.g., an embedded video, an embedded image, or an embedded audio file. In one implementation, one or more computing devices (e.g., a client computing device or server) may receive an initiation of a query within an input box in a control region of the web browser window. The control region may be external to the webpage display region (e.g. within the web browser Chrome). For example, the control region may be a header of the web browser window that includes a back button, a forward button, and the input box. The input box may be a uniform resource locator (URL) input box, a search input box associated with a search engine, or an omnibox configured to receive both search inputs and URL inputs. The initiation of the query may include one or more characters of the query typed into the input box or an indication of a cursor being placed within the input box. The one or more computing devices may also provide for display a dropdown region within the web browser window in response to the initiation of the query. The dropdown region may be adjacent to the input box. The dropdown region may include one or more suggested completions to the initiation of the query. At least one of the one or more suggested completions is associated with a second webpage. The second webpage may be different from the first webpage that is displayed within the webpage display region of the web browser window. The one or more computing devices may also provide for display a webpage preview of the second webpage within the dropdown region. The webpage preview of the second webpage may be a smaller version of the second webpage (e.g., a thumbnail version of the second webpage or a version of the second webpage having its length and width multiplied by 20%). The first webpage may still be displayed within the webpage display region when the webpage preview of the second webpage is displayed within the dropdown region.

Advantageously, in some implementations of the subject technology, more information about the suggested query completion may be provided to the user of the web browser window. For example, in addition to receiving the indication that the URL "www.example.com" is a suggested query completion, the user may also receive a webpage preview of a webpage associated with the URL "www.example.com." The webpage preview may include an indication of information (e.g., text, images, videos, or audio files) from the webpage.

Figure 1:
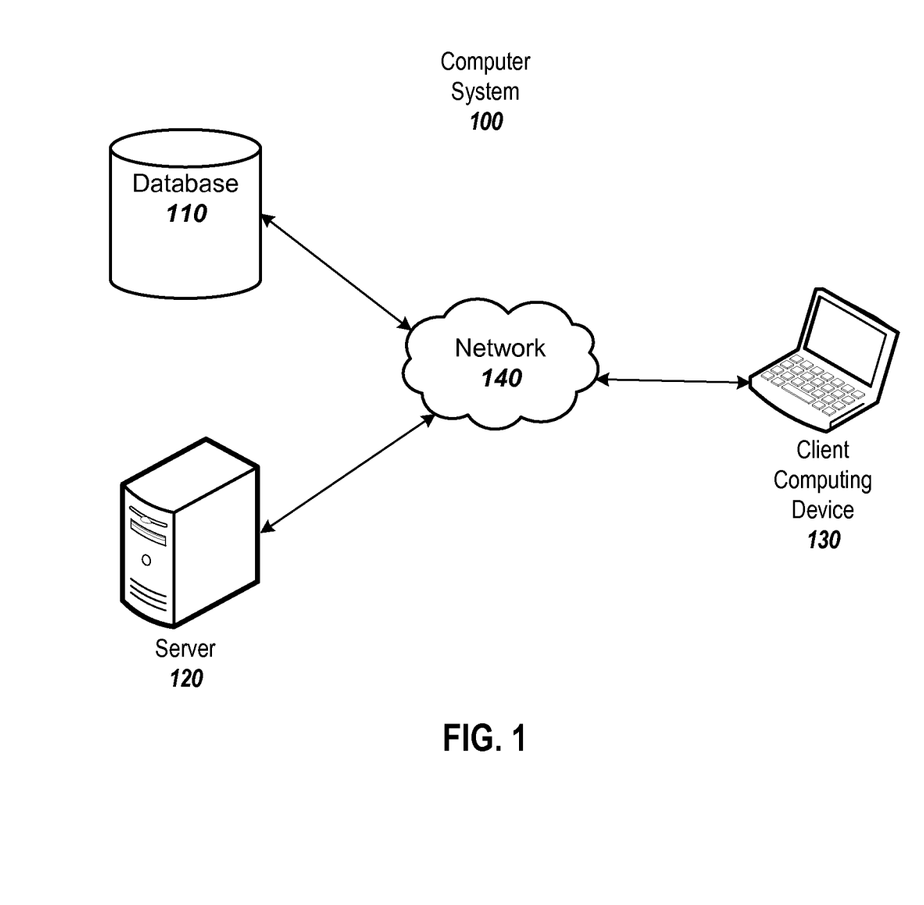
FIG. 1 illustrates an example of a computer system configured to display a suggested query completion within a web browser window.

FIG. 1 illustrates an example of a computer system 100 configured to display a suggested query completion within a web browser window. As shown, the computer system 100 includes a database 110, a server 120, and a client computing device 130. The database 110, server 120, and client computing device 130 may be configured to communicate with one another via a network 140. The network 140 may include the Internet, an intranet, a local area network, a wide area network, a wired network, a wireless network, or a virtual private network (VPN).

The database 110 may store data (e.g., text, images, videos, audio files, etc.) related to one or more webpages, a webpage index for searching webpages, or any other information. The database may include a single machine, multiple machines, a single processor system, or a multi-processor system. One example of the database 110 is described in more detail in conjunction with FIG. 2 below.

The server 120 may include a module to search webpages within the database 110 or other sources. The server 120 may be implemented as a single machine with a single processor, a multi-processor machine, or a server farm including multiple machines with multiple processors. One example of the server 120 is described in more detail in conjunction with FIG. 3 below.

The client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 130 may include one or more of a keyboard, a mouse, a display, or a touch screen. The client computing device 130 may also include a web browser configured to display webpages or search webpages. While only one client computing device 130 is illustrated in FIG. 1, the subject technology may be implemented in conjunction with one or more client computing devices 130. One example of the client computing device 130 is described in more detail in conjunction with FIG. 4 below.

Figure 2:
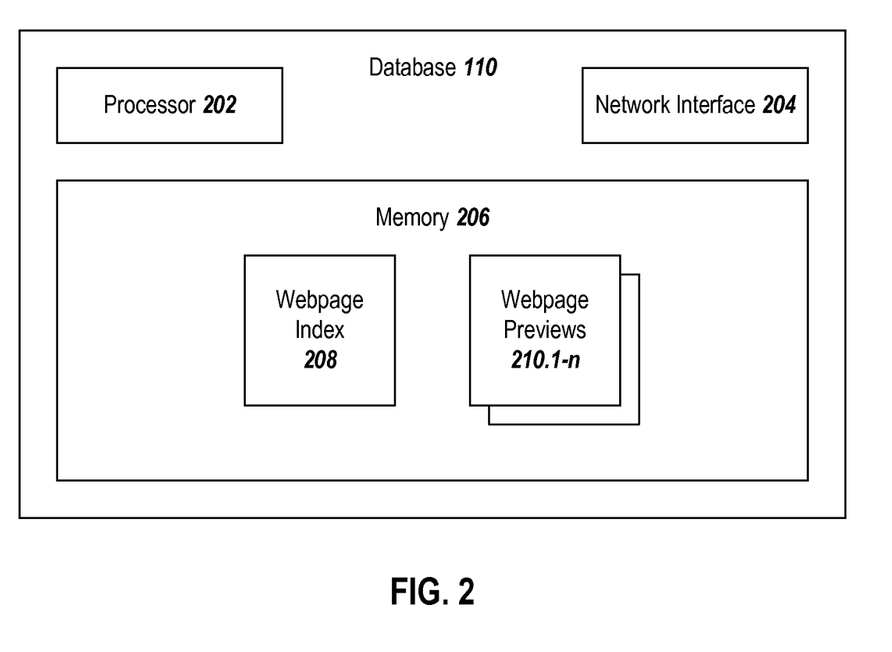
FIG. 2 illustrates an example of the database of FIG. 1 in more detail.

FIG. 2 illustrates an example of the database 110 in more detail.

As shown, the database 110 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the database 110 may include multiple processors. The network interface 204 is configured to allow the database 110 to transmit and receive data in a network, e.g., network 140 of FIG. 1. The network interface 204 may include one or more network interface cards (NICs). The memory 206 may store data or instructions. As illustrated, the memory 206 includes a webpage index 208 and one or more webpage previews 210.1-*n*.

The webpage index 208 may include an index of one or more webpages. The one or more webpages may be stored within the database 110 or outside the database 110. The webpage index 208 may be organized by keyword, by search term, by search query, or any similar organization approach.

The webpage previews 210.1-*n* may include miniature versions of webpages. In one example, the webpage previews 210.1-*n* may include rendered HTML code. The webpage previews 210.1-*n* may include one or more embedded items, e.g., an embedded video, an embedded image, or an embedded audio file, with which the user may interact via the webpage previews. Alternatively, a webpage preview 210.1-*n* may include an image, e.g., represented as a JPG or GIF file, based on a display provided by a webpage. The image may not include rendered HTML code. In one example, the webpage previews 210.1-*n* are smaller versions of webpages, e.g., versions of webpages having their length multiplied by a fixed percentage, e.g., 20%, and their width multiplied by a fixed percentage, e.g., 20%. Alternatively, the webpage preview of a webpage may include a logo and/or a key image from the webpage. If a webpage includes a video, the associated webpage preview may include one or more image snapshots from the video (e.g., as part of the rendered HTML code or as part of a JPG or GIF file in an image corresponding to the webpage preview 210.1-*n*). Other data may also be included in the webpage previews 210.1-*n*.

Figure 3:
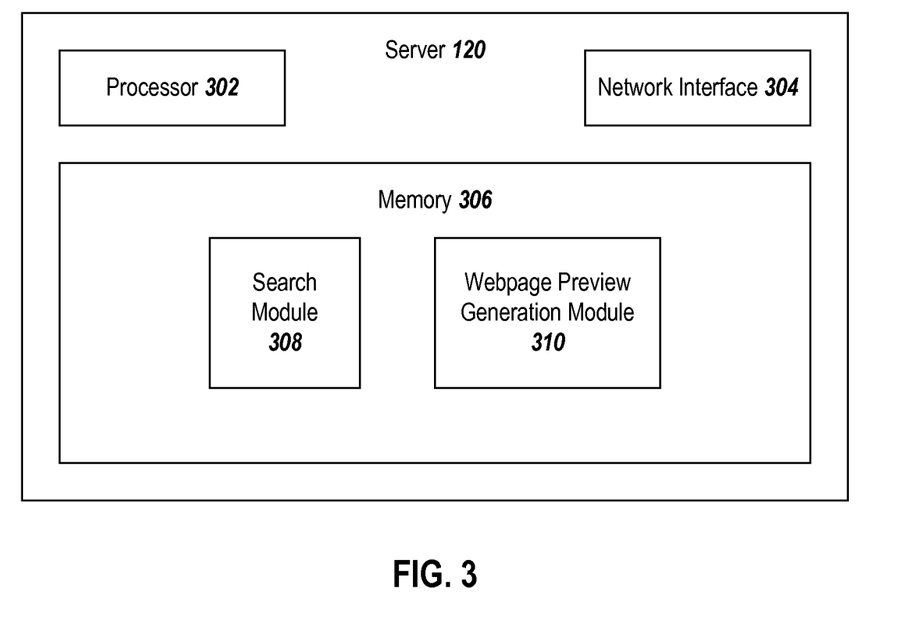
FIG. 3 illustrates an example of the server of FIG. 1 in more detail.

FIG. 3 illustrates an example of the server 120 in more detail.

As shown, the server 120 includes a processor 302, a network interface 304, and a memory 306. The processor 302 is configured to execute computer instructions that are stored in a computer-readable medium, for example, the memory 306. The processor 302 may be a central processing unit (CPU). While only one processor 302 is illustrated, the server 120 may include multiple processors. Furthermore, while the server 120 is illustrated as a single machine, the server 120 may include multiple machines, e.g., within a server farm. The network interface 304 is configured to allow the server 120 to transmit and receive data in a network, e.g., network 140 of FIG. 1. The network interface 304 may include one or more network interface cards (NICs). The memory 306 may store data or instructions. As illustrated, the memory 306 includes a search module 308 and a webpage preview generation module 310.

The search module 308 is configured to provide for searching a database based on a received query. The query may include a uniform resource locator (URL), a text query, an image query, or a combination of two or more of the above. Example queries may include: "www.newspaper.com," "automobile," search for "elephant" within the "www.example.com" domain, or a photograph of the Empire State Building.

In one example, the search module 308 is implemented in software. The search module 308 may include code for receiving (e.g., on the server 120) an initiation of a query within an input box in a control region of the web browser window (e.g., on the client computing device 130), where the control region is external to the webpage display region. The search module 308 may also include code for providing for display a dropdown region within the web browser window in response to the initiation of the query, where the dropdown region includes one or more suggested completions to the initiation of the query, where at least one of the one or more suggested completions is associated with a second webpage. The search module 308 may also include code for providing for display a webpage preview of the second webpage within the dropdown region. The webpage preview of the second webpage may be one of the webpage previews 210.1-*n* stored in the database 110. The webpage preview of the second webpage may be generated by the webpage preview generation module 310.

The webpage preview generation module 310 may be implemented in software. The webpage preview generation module 310 may include code for receiving a webpage and for generating a webpage preview for the webpage. The webpage preview may be generated by facilitating rendering HTML on a client computing device (e.g., client computing device 130) or by providing an image, e.g., a JPG file, for display on the client computing device. The webpage preview may be generated based on the content of the webpage. In one example, the webpage preview for a webpage includes a smaller versions of the webpage, e.g., a version of the webpage having its length multiplied by a fixed percentage, e.g., 20%, and its width multiplied by a fixed percentage, e.g., 20%. Alternatively, the webpage preview of a webpage may include a logo and/or a key image from the webpage. If a webpage includes a video, the associated webpage preview may include one or more image snapshots from the video. Other data may also be included in the webpage preview of the webpage.

Figure 4:
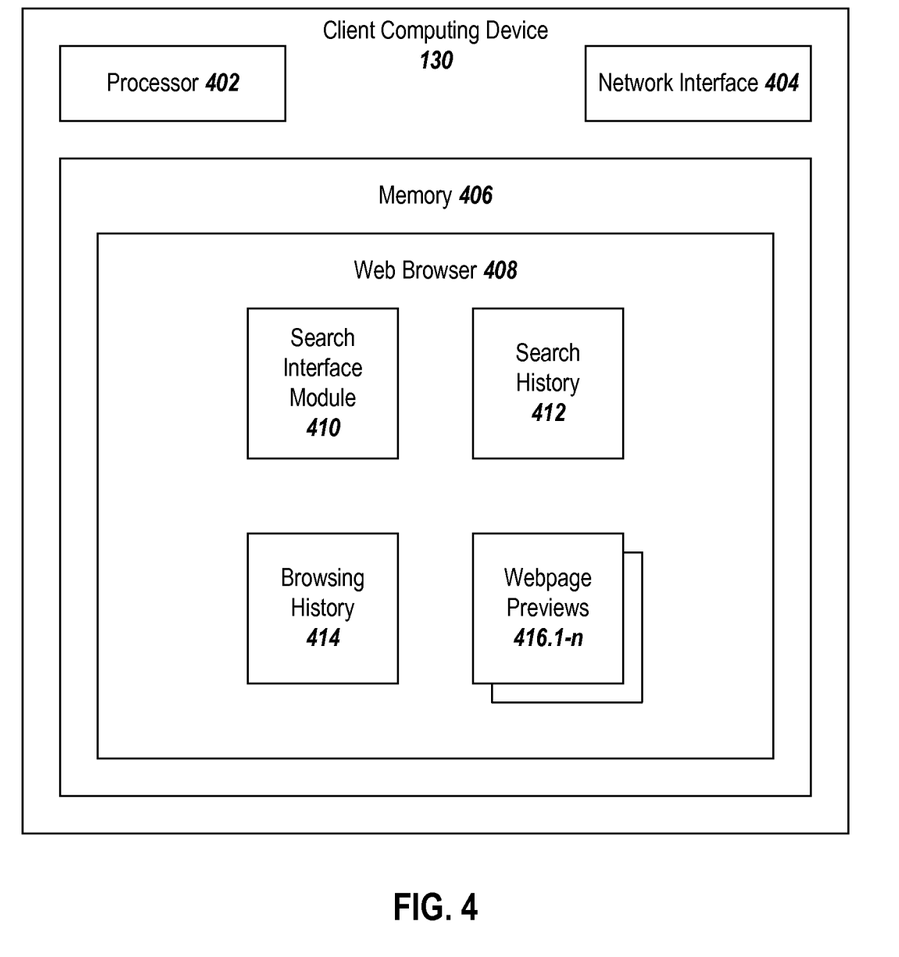
FIG. 4 illustrates an example of the client computing device of FIG. 1 in more detail.

FIG. 4 illustrates an example of the client computing device 130 in more detail.

As shown, the client computing device 130 includes a processor 402, a network interface 404, and a memory 406. The processor 402 is configured to execute computer instructions that are stored in a computer-readable medium, for example, the memory 406. The processor 402 may be a central processing unit (CPU). The network interface 404 is configured to allow the client computing device 130 to transmit and receive data in a network, e.g., network 140 of FIG. 1. The network interface 404 may include one or more network interface cards (NICs). The memory 406 may store data or instructions. As illustrated, the memory 406 includes a web browser 408.

The web browser 408 may be configured to display webpages via a display and/or to search webpages. An example of a web browser (e.g., web browser 408) displaying a webpage in a display is provided in FIG. 5 and described in detail below. As illustrated, the web browser 408 include a search interface module 410, a search history 412, a browsing history 414, and one or more webpage previews 416.1-*n*.

The search interface module 410 may include code for receiving, via the web browser 408, an initiation of a query within an input box in a control region of the web browser window, where the control region is external to the webpage display region. The initiation of the query may include an initiation of a search term (e.g., "autom" for "automobile") or an initiation of a URL address (e.g., "www.exa" for "www.example.com"). The search interface module 410 may also include code for providing for display a dropdown region within the web browser window in response to the initiation of the query, where the dropdown region includes one or more suggested completions to the initiation of the query, where at least one of the one or more suggested completions is associated with a second webpage. The search module 308 may also include code for providing for display a webpage preview of the second webpage within the dropdown region. The webpage preview of the second webpage may be one of the webpage previews 210.1-*n* stored in the database 110. The webpage preview of the second webpage may be generated by the webpage preview generation module 310.

The search history 412 includes a history of search queries entered into the web browser 408 (e.g., in a search box of the web browser 408) during a certain period, e.g., since clearing the search history 412, since installing the web browser 408, or in the last two weeks). For example, during the last two weeks, a user may have entered the search queries "automobile," "sushi San Francisco," and "elephant" in the search box of the web browser window. These search queries may be saved in the search history 412.

The browsing history 414 includes a set of URLs visited by the web browser 408 during a certain period, e.g., since clearing the browsing history, since installing the web browser 408, or in the last two weeks). For example, since clearing the browsing history 414, the web browser may have visited the URLs, www.example.com, www.store.com, www.newspaper.com, and www.socialnetwork.com. These URLs may be saved in the browsing history 414.

The webpage previews 416.1-*n* may include previews for one or more webpages. For example, the webpage previews 416.1-*n* may include previews of webpages associated with URLs in the browsing history 414 or previews of webpages previously displayed in response to queries entered on the web browser 408. As described above, the webpage preview for a webpage may be generated based on the content of the webpage. In one example, the webpage preview for a webpage includes a smaller versions of the webpage, e.g., a version of the webpage having its length multiplied by a fixed percentage, e.g., 20%, and its width multiplied by a fixed percentage, e.g., 20%. Alternatively, the webpage preview of a webpage may include a logo and/or a key image from the webpage. If a webpage includes a video, the associated webpage preview may include one or more image snapshots from the video. Other data may also be included in the webpage preview of the webpage.

In one example aspect, the webpage previews 416.1-n may include images (e.g., JPEG files) based on rendered HTML code or pre-rendered HTML code. Alternatively, the webpage previews 416.1-n may include links to a webpage which may be rendered when the webpage previews are to be provided for display. The webpage previews may be displayed after the user types a single character or more than one character (e.g., two characters, three characters, four characters, or more than four characters) into a URL input box or a search input box. For example, if a user accesses a webpage "xyz.com" by typing the characters x, y, z into the URL input box, a webpage preview of xyz.com may be provided for display when the user enters the character "x" in the URL input box. Alternatively, if the user enters the character "h" into a search input box, a webpage preview of a webpage preview of a webpage associated with a search term that includes the letter "h", e.g., "hello" or "Hawaii," may be provided for display. In one example aspect, a webpage preview may be provided as soon as the user places a cursor into the input box (URL input box, search input box, or omnibox). For example, if a user frequently accesses the webpage www.first.com by typing the URL in the omnibox, a webpage preview of www.first.com may be provided as soon as the user places the cursor in the omnibox, before the user types any characters.

In an additional aspect, the webpage preview(s) that are displayed may be modified as the user is typing in the input box. For example, after the user places the cursor in the omnibox, a webpage preview of www.first.com may be provided. After the user types the first letter "h," a webpage preview of a webpage associated with the search term "hello" may be provided, and the webpage preview associated with www.first.com may no longer be provided. After the user types in first two letters "ha," a webpage preview of a webpage associated with the search term "Hawaii" may be provided, and ht webpage preview of the webpage associated with the search term "hello" may no longer be provided.

Figure 5:
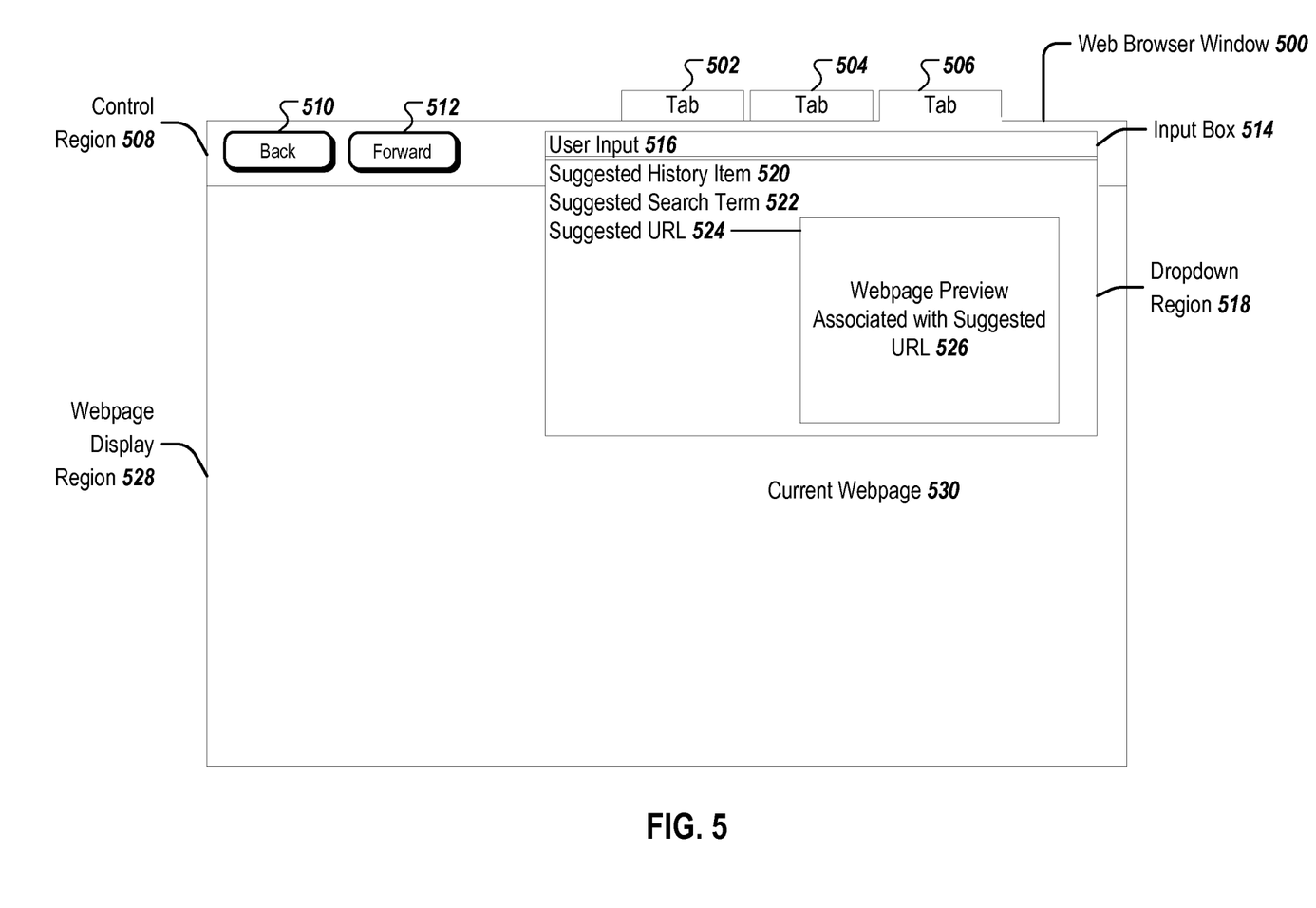
FIG. 5 illustrates an example of a web browser window configured to display a suggested query completion and web page preview.

FIG. 5 illustrates an example of a web browser window 500 configured to display a suggested query completion and web page preview. As shown, the web browser window includes one or more tabs 502, 504, and 506. One of the tabs 506 may be displayed while the remaining tabs 502 and 504 may be stored, e.g., to download information or for later display. The displayed tab 506 may include a control region 508, a dropdown region 518, and a webpage display region 528.

As illustrated, the control region 508 includes a back button 510, a forward button 512, and an input box 514. The control region 508 may include the header of the web browser window 500. However, the control region 508 may be located in other positions of the web browser window 500, for example, in the footer of the web browser window 500 or in the left-hand side or right-hand side of the web browser window 500.

The back button 510 may be configured to display a webpage that was previously viewed. For example, the web browser window 500 may first display a webpage associated with the URL www.first.com and later display a webpage associated with the URL www.second.com. The web browser window 500 may switch from displaying the webpage associated with www.first.com to displaying the webpage associated with www.second.com responsive to the user entering the URL www.second.com or clicking a link to www.second.com. Upon the user selecting the back button 510 while the webpage associated with www.second.com is displayed, the web browser window 500 may revert to displaying the webpage associated with www.first.com.

The forward button 512, when selected, may be configured to undo the operation of the back button 510. For example, if the user employs the back button 510 to cause the web browser window 500 to display the webpage associated with www.first.com rather than the webpage associated with www.second.com, selecting the forward button may cause the web browser window to display the webpage associated with www.second.com again.

The input box 514 may be configured to receive a user input 516. The user input 516 may be a query (e.g., a search query or a URL query). The input box may be a URL input box, a search input box associated with a search engine, or an omnibox configured to receive both URL inputs and search inputs.

When the user begins to enter the user input 516 in the input box 514 (e.g., when the user places a cursor in the input box 514 or begins typing in the input box 514), the dropdown region 518 may be displayed adjacent to the input box 514. The user may enter an initiation of a query as the user input 516 in the input box 514. The initiation of the query may include placing the cursor in the input box 514 or typing one or more characters in the input box 514. Responsive to the user input 516, one or more suggested query completions 520, 522, and 524 may be displayed in the dropdown region 518.

The one or more suggested query completions 520, 522, and 524 may include, for example, one or more suggested history items 520, one or more suggested search terms 522, or one or more suggested URLs 524. A suggested history item 520 may be an item from the search history (e.g., search history 412) or the browsing history (e.g., browsing history 414) of the web browser associated with the web browser window 500. A suggested search term 522 may be, for example, a suggested term that includes the characters or permutations of the characters (e.g., switching between uppercase and lowercase characters) in the user input 516. A suggested URL 524 may be, for example, a URL that includes the characters or permutations of the characters (e.g., switching between uppercase and lowercase characters) in the user input 516. For example, the user input 516 may include the characters "san." Responsive to this user input, a suggested history item 520 may include a webpage titled "San Francisco Municipal Transportation Agency," that the web browser associated with the web browser window 500 has previously displayed. A suggested search term 522 may include the words "San Diego Zoo." A suggested URL 524 may include the URL "www.santaclaus.com."

As shown, one or more of the suggested query completions 520, 522, or 524, e.g., suggested URL 524, may be associated with a webpage preview 526. The webpage preview 526 may include a preview of a webpage associated with the suggested URL 524, as described above. For example, if the suggested URL is "www.santaclause.com," the webpage preview 526 may include a miniature version of the information displayed in the webpage associated with www.santaclaus.com. If the suggested search term is "tennis player," the webpage preview 526 may include a miniature version of the information displayed in a webpage associated with a search result for the search term "tennis player." The webpage associated with the search result for the search term "tennis player" may be the first search result, the second search result, or any member of a set of search results for the search term "tennis player."

The web browser window 500 may also include a webpage display region 528. The webpage display region may display a current webpage 530 that the user of the web browser window 500 is currently viewing or was viewing immediately before having entered the user input 516. The current webpage may be, for example, a webpage associated with the URL "www.magazine.com." In one example, the webpage preview 526 may be displayed simultaneously with the current webpage 530. As a result, the user may be able to view the webpage preview 526 and the current webpage 530 simultaneously in the same tab 506 of the web browser window 500. Thus, the user may be able to simultaneously view information related to the user input 516 (e.g., webpage preview 526) and information in the current webpage 530. In the above example, the user may view information from both the current webpage 530 "www.magazine.com" and the webpage preview 526 of "www.santaclaus.com" in the tab 506 of the web browser window 500.

Figure 6:
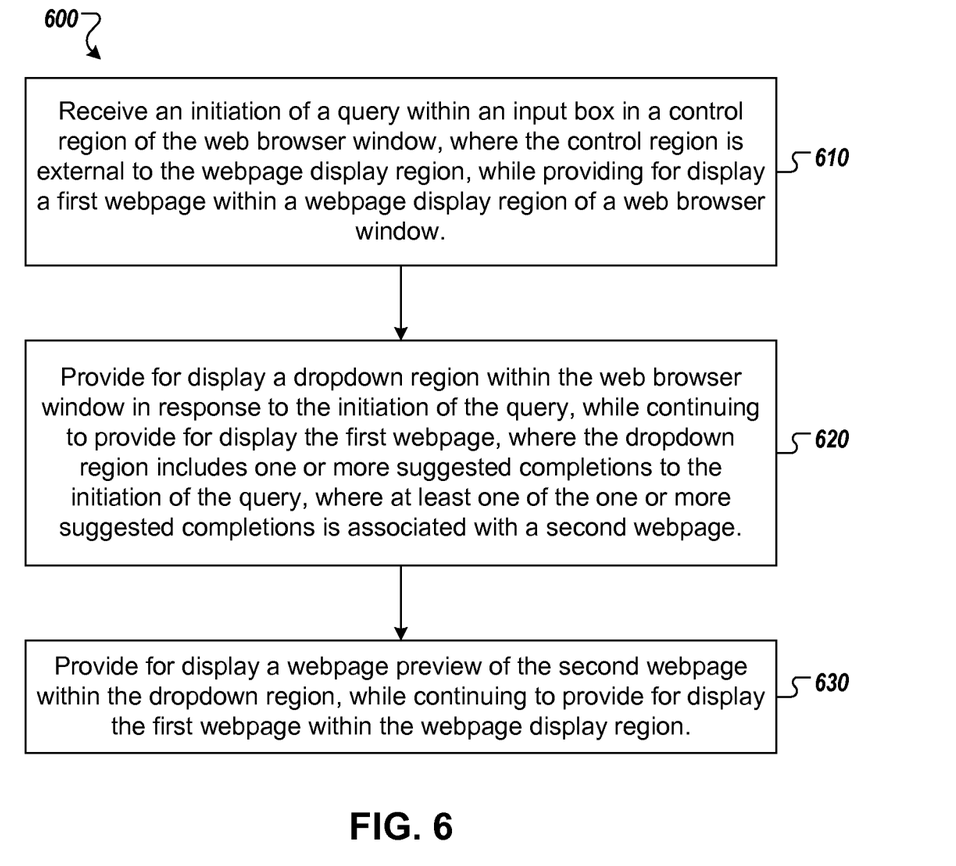
FIG. 6 illustrates an example process by which a suggested query completion and web page preview may be displayed within a web browser window.

FIG. 6 illustrates an example process 600 by which a suggested query completion and web page preview may be displayed within a web browser window.

The process 600 begins at step 610, where one or more computing devices (e.g., client computing device 130 or server 120) receive an initiation of a query within an input box (e.g., a search input box associated with one or more search engines, a URL input box, or an omnibox configured to receive both search inputs and URL inputs) in a control region of the web browser window, while providing for display a first webpage within a webpage display region of the web browser window. The control region may be external to the webpage display region. The initiation of the query may include at least one character typed within the input box. In one implementation, the initiation of the query may include an indication of a cursor being placed within the input box.

In step 620, the one or more computing devices provide for display a dropdown region within the web browser window in response to the initiation of the query, while continuing to provide for display the first webpage within the webpage display region of the web browser window. The dropdown region may partially overlap with the webpage display region and/or the control region. The dropdown region may be adjacent to the input box. The dropdown region may include one or more suggested completions to the initiation of the query. At least one of the one or more suggested completions may be associated with a second webpage. The second webpage may be different from the first webpage. For example, one of the one or more suggested completions may be a URL of a second webpage (e.g., www.example.com) or a search query associated with a webpage (e.g., the search query "Paris Metro" may be associated with a webpage of the subway system of Paris, France). If the initiation of the query includes at least one character typed within the input box, the suggested completion(s) of the query may also include the character(s) typed within the input box. If the initiation of the query includes an indication of a cursor being placed within the input box, the suggested completion(s) of the query may include frequently visited webpages or other frequently viewed content of the web browser based on the browsing history of the web browser or the searching history of the web browser. I.e., if the initiation of the query does not include any characters typed into the input box and a user of the web browser frequently views the webpage associated with the URL "www.newspaper.com," the second webpage may correspond to the URL "www.newspaper.com." One or more suggested search terms may be based on a searching history of the web browser. One or more suggested URLs may be based on a browsing history of the web browser.

In step 630, the one or more computing devices provide for display a webpage preview of the second webpage within the dropdown region, while continuing to provide for display the first webpage within the webpage display region. The webpage preview may include a thumbnail version of the second webpage, i.e., a version of the second webpage reduced in size and/or level of detail. The thumbnail version of the second webpage may be retrieved from within a database external to the one or more computing devices or from a local memory of a computing device displaying the web browser window. The webpage preview of the second webpage may be provided for display within the dropdown region in real-time after receiving the initiation of the query. As used herein, the term "real-time" refers to one or more computing devices providing an output within a certain time period after receiving an input. The certain time period may be, for example, less than one hour, thirty minutes, five minutes, one minute, ten seconds, or one second depending on the processing speed of the one or more computing devices, the processing speed of the network connection, the size of the input, the size of the output, and the size of the data to be processed in generating the output. The webpage preview of the second webpage may include one or more images from within the second webpage and/or text from within the second webpage.

In one implementation, the one or more computing devices may receive an indication of a selection of the webpage preview of the second webpage (e.g., an indication of a mouse click within the webpage preview of the second webpage). In response to the indication of the selection of the webpage preview of the second webpage, the one or more computing devices may provide for display the second webpage within the webpage display region. After step 630, the process 600 ends.

Figure 7:
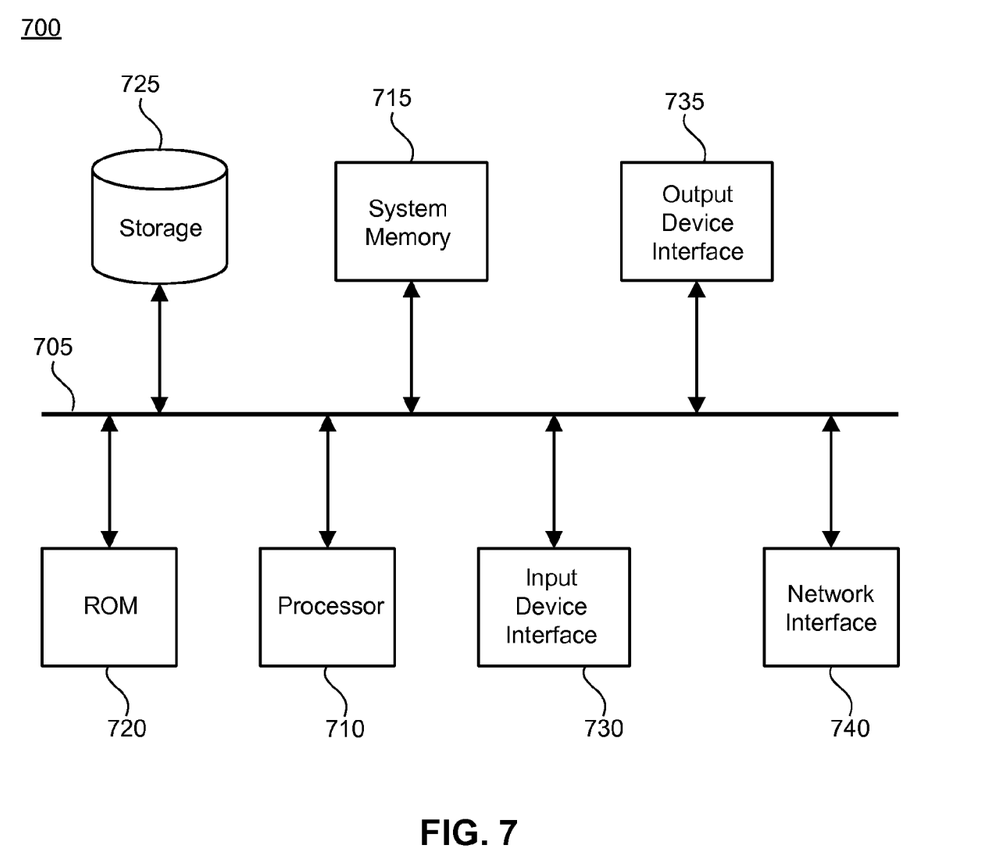
FIG. 7 conceptually illustrates an example electronic system with which some implementations of the subject technology are implemented.

FIG. 7 conceptually illustrates an electronic system 700 with which some implementations of the subject technology are implemented. For example, one or more of the database 110, the server 120, or the client computing device 130 may be implemented using the arrangement of the electronic system 700. The electronic system 700 can be a computer (e.g., a mobile phone, PDA), or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, an input device interface 730, an output device interface 735, and a network interface 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some implementations of the subject technology use a mass-storage device (for example a magnetic or optical disk and its corresponding disk drive) as the permanent storage device 725.

Other implementations use a removable storage device (for example a floppy disk, flash drive, and its corresponding disk drive) as the permanent storage device 725. Like the permanent storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the processes of the subject technology are stored in the system memory 715, the permanent storage device 725, or the read-only memory 720. For example, the various memory units include instructions for displaying a suggested query completion within a web browser window in accordance with some implementations. From these various memory units, the processing unit(s) 710 retrieves instructions to execute and data to process in order to execute the processes of some implementations.

The bus 705 also connects to the input and output device interfaces 730 and 735. The input device interface 730 enables the user to communicate information and select commands to the electronic system. Input devices used with input device interface 730 include, for example, alphanumeric keyboards and pointing devices (also called "cursor control devices"). Output device interfaces 735 enables, for example, the display images generated by the electronic system 700. Output devices used with output device interface 735 include, for example, printers and display devices, for example cathode ray tubes (CRT) or liquid crystal displays (LCD). Some implementations include devices for example a touchscreen that functions as both input and output devices.

Finally, as shown in FIG. 7, bus 705 also couples electronic system 700 to a network (not shown) through a network interface 740. In this manner, the electronic system 700 can be a part of a network of computers (for example a local area network ("LAN"), a wide area network ("WAN"), or an Intranet, or a network of networks, for example the Internet. Any or all components of electronic system 700 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for displaying a suggested query completion in a web browser window while providing for display a first webpage within a webpage display region of the web browser window, the method comprising:
    receiving an initiation of a query within an input box in a control region of the web browser window, wherein the control region is external to the webpage display region;
    providing for display a dropdown region within the web browser window in response to the initiation of the query, wherein the dropdown region partially overlaps with the webpage display region, wherein the dropdown region comprises one or more suggested completions to the initiation of the query, and wherein at least one of the one or more suggested completions is associated with a second webpage; and
    providing for display, in real-time after receiving the initiation of the query, within the dropdown region and external to the input box and the webpage display region, an image comprising a webpage preview of the second webpage.

2. The method of claim 1, wherein the initiation of the query comprises at least one character typed within the input box.

3. The method of claim 1, wherein the initiation of the query comprises an indication of a cursor being placed within the input box.

4. The method of claim 1, wherein the one or more suggested completions to the initiation of the query comprise one or more suggested search terms.

5. The method of claim 4, wherein at least one of the one or more suggested search terms is based on a searching history of a web browser associated with the web browser window.

6. The method of claim 1, wherein the one or more suggested completions to the initiation of the query comprise one or more suggested uniform resource locators (URLs).

7. The method of claim 6, wherein at least one of the one or more suggested URLs is based on a browsing history of a web browser associated with the web browser window.

8. The method of claim 1, wherein the webpage preview of the second webpage comprises one or more images from within the second webpage and text from within the second webpage.

9. The method of claim 1, wherein the webpage preview of the second webpage comprises a thumbnail version of the second webpage.

10. The method of claim 9, further comprising retrieving the thumbnail version of the second webpage from within a database.

11. The method of claim 1, wherein the control region of the web browser window comprises a header of the web browser window, wherein the header of the web browser window comprises a back button and a forward button.

12. The method of claim 1, wherein the input box comprises a search input box associated with a search engine.

13. The method of claim 1, wherein the input box comprises a uniform resource locator (URL) input box.

14. The method of claim 1, wherein the input box comprises an omnibox, wherein the omnibox comprises a single input box configured to function as both a search input box associated with a search engine and a uniform resource locator (URL) input box.

15. The method of claim 1, further comprising:
storing, at a computing device displaying the web browser window, the webpage preview of the second webpage being one of the plurality of webpage previews stored at the computing device.

16. The method of claim 1, wherein the dropdown region partially overlaps with the control region.

17. The method of claim 1, wherein the dropdown region is adjacent to the input box.

18. The method of claim 1, wherein providing for display the webpage preview of the second webpage within the dropdown region comprises providing for display the webpage preview of the second webpage within the dropdown region in real-time after receiving the initiation of the query.

19. A computer-readable medium for displaying a suggested query completion in a web browser window while providing for display a first webpage within a webpage display region of the web browser window, the computer-readable medium comprising instructions which, when executed by a computer, cause the computer to:
receive an initiation of a query within an input box in a control region of the web browser window;
provide for display a dropdown region within the web browser window in response to the initiation of the query, wherein the dropdown region partially overlaps with the webpage display region, wherein the dropdown region comprises one or more suggested completions to the initiation of the query, and wherein at least one of the one or more suggested completions comprises a uniform resource locator (URL) of a second webpage; and
provide for display, in real-time after receiving the initiation of the query, within the dropdown region and external to the input box and the webpage display region, an image comprising a thumbnail version of the second webpage.

20. The computer-readable medium of claim 19, further comprising instructions which, when executed by the computer, cause the computer to:
provide for retrieving the thumbnail version of the second webpage from within a database.

21. The computer-readable medium of claim 19, further comprising instructions which, when executed by the computer, cause the computer to:
provide for retrieving the thumbnail version of the second webpage from within a local memory of a computing device displaying the web browser window.

22. The computer-readable medium of claim 19, wherein the control region is external to the webpage display region.

23. A system for displaying a suggested query completion in a web browser window while providing for display a first webpage within a webpage display region of the web browser window, the system comprising:
one or more processors; and
a memory comprising instructions which, when executed by the one or more processors, cause the one or more processors to:
receive an initiation of a query within an input box in a control region of the web browser window, wherein the initiation of the query comprises at least one character;
provide for display a dropdown region within the web browser window in response to the initiation of the query, wherein the dropdown region partially overlaps with the webpage display region, wherein the dropdown region comprises one or more suggested completions to the initiation of the query, and wherein at least one of the one or more suggested completions comprises a uniform resource locator (URL) of a second webpage, and
provide for display, in real-time after receiving the initiation of the query, within the dropdown region and external to the input box and the webpage display region, an image comprising a webpage preview of the second webpage.

24. The system of claim 23, wherein the memory further comprises instructions which, when executed by the one or more processors, cause the one or more processors to:
receive an indication of a selection of the webpage preview of the second webpage; and
in response to the indication of the selection of the webpage preview of the second webpage, provide for display the second webpage within the webpage display region.

25. The system of claim 24, wherein the indication of the selection of the webpage preview of the second webpage comprises an indication of a mouse click over the webpage preview of the second webpage.

26. The system of claim 23, wherein the control region is external to the webpage display region.

27. The system of claim 23, wherein the system comprises a server configured to interact with a client computing device via a network.

28. The system of claim 23, wherein the system comprises a client computing device.

* * * * *